United States Patent [19]

Williston et al.

[11] Patent Number: 4,841,790
[45] Date of Patent: Jun. 27, 1989

[54] ELECTRO MECHANICAL ACTUATOR

[75] Inventors: Scott L. Williston, Flint; Mark A. Sweigart, Saginaw, both of Mich.

[73] Assignee: General Motors Corporation, Detroit, Mich.

[21] Appl. No.: 199,733

[22] Filed: May 27, 1988

[51] Int. Cl.$^4$ .................... F16H 25/22; B62D 5/04
[52] U.S. Cl. .................... 74/89.15; 74/424.8 R; 180/79.1
[58] Field of Search ............. 74/89.15, 424.8 R; 180/79.1

[56] References Cited

U.S. PATENT DOCUMENTS

| | | | |
|---|---|---|---|
| 1,945,496 | 1/1934 | Sloan et al. | 74/89.15 X |
| 3,860,029 | 1/1975 | Hubler | 74/89.15 X |
| 4,593,780 | 6/1986 | Saito | 180/79.1 |
| 4,765,426 | 8/1988 | Shimizu | 180/79.1 |
| 4,771,845 | 9/1988 | Shimizu | 180/79.1 |

Primary Examiner—Allan D. Herrmann
Attorney, Agent, or Firm—Saul Schwartz

[57] ABSTRACT

An electro-mechanical linear actuator particularly attractive for vehicle steering applications includes a case having a cover part rigidly attached to a housing part and an output rod supported on the case for linear shiftable movement along a primary axis of the case. An electric motor is mounted on the housing part of the case with a shaft of the motor supporting in cantilever fashion a pinion in a gear chamber of the case between the housing and cover parts. A drive gear is disposed in the gear chamber around output rod and meshes with the pinion. A tubular hub surrounds the output rod and is rigidly attached to the drive gear. A pair of taper roller bearings mount the tubular hub in cantilever fashion on the housing part for rotation about the primary axis. A ball screw assembly between the tubular hub and the output rod moves the rod linearly when the hub rotates.

3 Claims, 1 Drawing Sheet

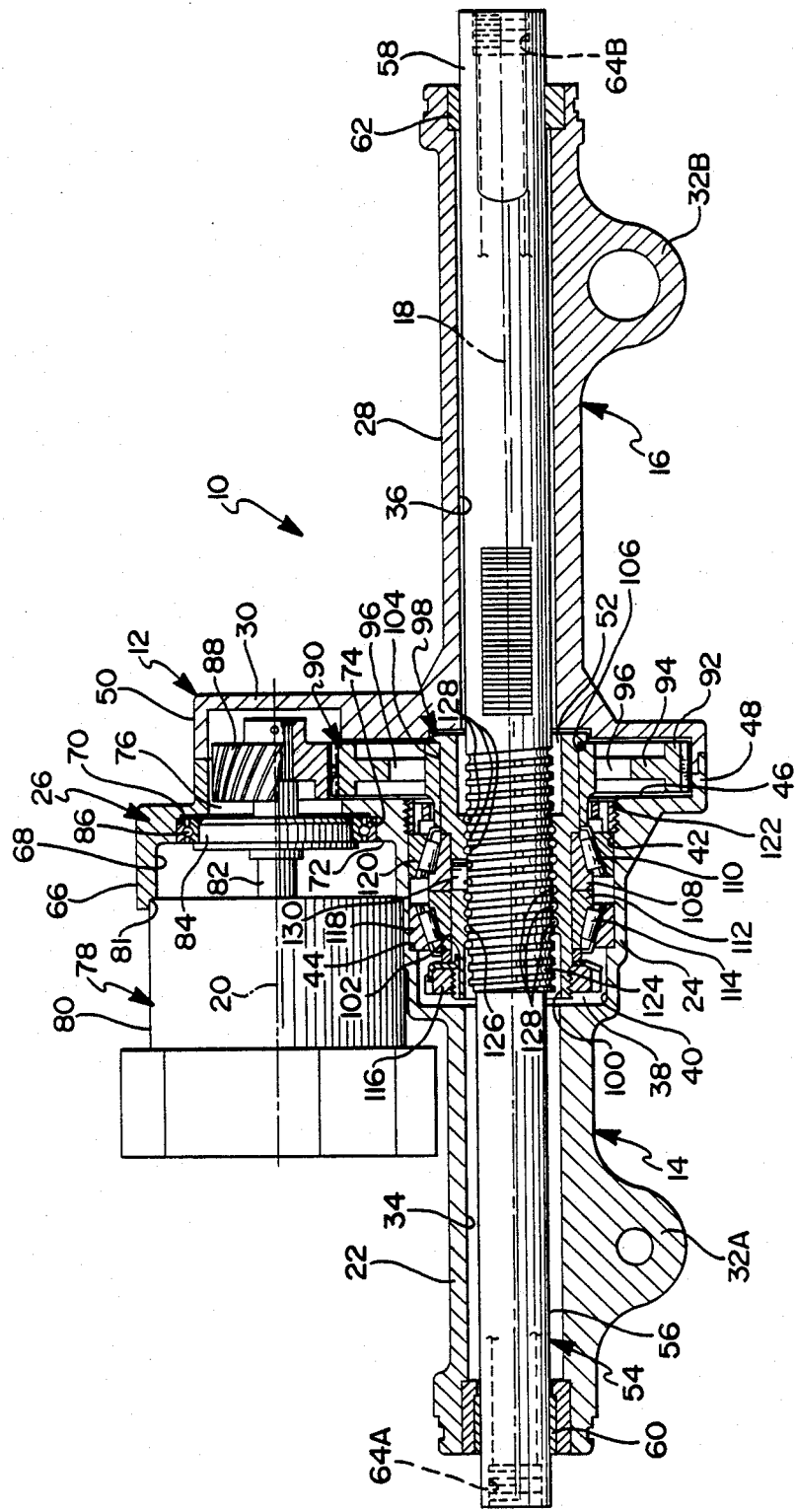

ELECTRO MECHANICAL ACTUATOR

FIELD OF THE INVENTION

This invention relates to electro-mechanical actuators suitable for vehicle steering system applications.

BACKGROUND OF THE INVENTION

Front and/or rear wheels of automobiles are commonly steered in pairs by a linearly shiftable lateral rod, such as a rack in a rack and pinion steering gear, connected at opposite ends to steering knuckles. In manual rack and pinion steering gears, the rod is shifted mechanically by a pinion meshing with rack teeth on the rod. In typical hydraulic power assisted rack and pinion steering gears, the manual effort of the driver is augmented by the output of a fluid motor connected directly to the rod. In electric power assisted rack and pinion steering gears, the manual effort of the driver is augmented by the output of an electro-mechanical actuator which converts the rotary output of an electric motor into linear movement of the rod. The economies effected by eliminating pumps, valves, hoses and the like, together with the availability of improved controllers and sensors, make electro-mechanical actuators attractive for automotive applications. An electro-mechanical linear actuator according to this invention is particularly suited for automotive steering systems and incorporates novel structural elements which simplify the manufacture of the actuator and thereby contribute to manufacturing economy and to improved durability.

SUMMARY OF THE INVENTION

This invention is a new and improved electormechanical linear actuator particularly suited for automotive steering system applications. The actuator according to this invention has a two part case consisting of rigidly connected housing and cover parts which together define a primary axis of the case. The actuator according to this invention also has a rod disposed on the case for bodily shiftable movement in the direction of the primary axis, an electric motor on the housing part whose shaft rotates about an axis parallel to the primary axis, a ball screw including threads on the rod and on a tubular hub cantilever mounted on the housing part around the rod, and a pair of reduction gears between the motor shaft and the tubular hub for transferring torque from the motor to the hub. Because the hub is cantilever mounted on the housing part, the mounting features for both the motor and the hub are machined on only one part of the case, thereby simplifying the machining process and improving the ultimate alignment between the gears attached to the hub and to the motor shaft.

BRIEF DESCRIPTION OF THE DRAWINGS

The single drawing FIGURE is a sectional view of an electro-mechanical linear actuator according to this invention.

DESCRIPTION OF THE PREFERRED EMBODIMENT

Referring to the drawings, an electro-mechanical actuator 10 suitable for vehicle steering applications has a case assembly 12 including a housing part 14 and a cover part 16 each fabricated, for example, as aluminum or alloy die castings. The housing and cover parts are rigidly connected by bolts, not shown, and cooperate in defining a primary axis 18 of the case and a parallel, laterally spaced secondary axis 20 of the case.

The housing part 14 has a tubular body 22 centered on the primary axis 18. The tubular body 22 merges with an integral enlarged end portion 24 also centered on the primary axis 18. The housing part further includes a motor support portion 26 centered generally on the secondary axis 20 and integral with the end portion 24. The cover part 16 has a tubular body 28 centered on the primary axis 18 and an integral enlarged end portion 30 having a perimeter corresponding to the perimeter of the end portion 24 and the motor support portion 26 of the housing part. A pair of lugs 32A-B are located, respectively, on the housing part tubular body 22 and on the cover part tubular body 28 and serve as convenient locations for attaching the case to a support structure such as a vehicle body.

Within the case, the tubular body 22 has in inside wall 34 and the tubular body 28 has a similar inside wall 36. The inside wall 34 opens into a bearing chamber 38 within the end portion 24 of the housing part. The bearing chamber 38 is bounded radially by a first cylindrical wall 40 and by a second, bigger diameter cylindrical wall 42. An annular shoulder 44 defines a step between the first and second cylindrical walls.

The bearing chamber 38 opens through a wall 46 of the housing part in a plane perpendicular to the primary axis 18. The wall defines the right extremity, FIG. 1, of both the end portion 24 and of the motor support portion 26 except for an integral flange 48 which extends around the perimeter of the wall 46 perpendicular to the plane thereof. The end portion 30 of the cover part 16 has a similar integral flange 50 therearound which abuts the end of the flange 48 on the housing part. A gear chamber 52 of the case is defined inboard of the abutting flanges 48 and 50 between the housing and cover parts. The bearing chamber 38 opens into the gear chamber 52.

The actuator 10 further includes a tubular output rod 54 aligned on the primary axis 18 and extending completely through the case. The rod has a cylindrical outside wall 56 extending over the major portion of the length of the rod and a non-circular outside wall portion 58 adjacent the right end of the rod. A first annular bushing 60 on the housing part 14 slidably engages the outside wall 56 of the rod near the left end thereof. A second, non-circular bushing 62 slidably engages the non-circular outside wall portion 58 of the rod and cooperates with the first bushing in supporting the rod on the case for linear bodily shiftable movement in the direction of the primary axis 18. The bushing 62 prevents the rod from rotating about the primary axis 18. The opposite ends of the rod 54 have a pair of threaded sockets 64A-B for attachment of steering tie rod ends or the like.

The motor support portion 26 of the housing part has an integral annular boss 66 centered on the secondary axis 20. The boss has a big diameter inside cylindrical wall 68 and a small diameter inside cylindrical wall 70 each centered on the secondary axis 20. The big diameter wall 68 ends at an annular step 72 and the small diameter wall ends at an annular step 74. The interior of the boss 66 opens into the gear chamber 52 through a clearance aperture 76 in the wall 46.

The actuator 10 further includes an electric motor 78 having an outside housing 80. The housing 80 pilots in a step 81 in the boss 66. The motor 78 is rigidly attached to the housing part 14 in any convenient fashion. The motor 78 has a shaft 82 centered on the secondary axis 20 rotatable in opposite directions. The shaft 82 carries a collar-like spacer 84 and is supported on the motor support portion 26 of the housing part for rotation about the secondary axis 20 by a bearing 86 press fitted in the small diameter wall 70 against the step 74. A pinion gear 88 is disposed in the gear chamber 52 and is connected to the motor shaft 82 to the right or outboard of collar 84 for rotation as a unit therewith.

A drive gear 90 is disposed in the gear chamber 52 in surrounding relation to the rod 54 and meshes with the pinion 88. The drive gear has an annular flange 92 on which the teeth of the gear are formed and a plurality of integral spokes 94 extending radially in from the flange. Some of the spokes are relieved or cut-out near the center of the gear as illustrated at 96.

A tubular hub 98 disposed around the rod 54 has an inside cylindrical wall 100 facing the rod and an outside cylindrical wall 102. The drive gear 90 is press fitted onto a big diameter portion 104 of the outside wall against a shoulder 106 on the hub whereby the hub is rotatable as a unit with the drive gear. An inner race 108 of a first taper roller bearing 110 is press fitted onto the outside wall 102 against a shoulder between the big and small diameter outside walls 104 and 102. An inner race 112 of a second taper roller bearing 114 is similarly press fitted onto the outside wall 102 of the hub and abuts the inner race 108. A nut 116 threaded onto the hub 98 to the left of the bearings captures the inner races 108 and 112 between itself and the shoulder between the big and small diameter walls.

An outer race 118 of the bearing 114 is press fitted into the second cylindrical wall 42 against the shoulder 44. An outer race 120 of the bearing 110 is similarly press fitted into the second cylindrical wall 42 in axially spaced relation to the outer race 118. A plurality of rollers between the races 102 and 118 and between the races 108 and 120 support the hub 98 on the housing part 14 for rotation about the primary axis 18. A spanner nut 122 threaded into the open end of second cylindrical wall 42 captures the outer races 118-120. Since the right end of the hub projects into the gear chamber 52 and is unsupported on the cover part 16, the hub 98 and drive gear 90 are supported on the housing part 14 by the bearings 110 and 114 in cantilever fashion.

A ball screw assembly connects the hub 98 to the rod 54 and includes an outside thread 124 on the rod and a corresponding inside thread 126 on the inside wall 100 of the hub. A plurality of bearing balls, not shown, are disposed in the channels defined between the threads 124-126 and recirculate through button-type ball guides 130 located in cut-outs in the hub 98 inboard of the inner races 108-112. When the motor 78 is turned on to rotate the shaft 82 and the pinion 88, the drive gear 90 rotates the hub 98 relative to the rod 18. The spanner nut 122 prevents bodily movement of the hub 98 in the direction of the primary axis 18. Accordingly, when the hub rotates, the rod 54 is driven linearly by the ball screw assembly in the direction of the primary axis 18.

With respect to actuator performance and durability, the alignment between the pinion 88 and the drive gear 90 is important. In the actuator 10, achievement of optimum alignment is facilitated by supporting the pinion 88 and the drive gear 90 only on the housing part 14 independently of the cover part 16. In that way, the features which determine the accuracy of the alignment, such as for example the spacing of the cylindrical walls 42 and 68 and the parallelism of the primary and secondary axes 18 and 20, are more accurately machined relative to each other. Further, assembly and machining tolerances related to the cover part do not effect alignment since the cover part functions only to close the gear chamber 52 and to support the right end of rod 54.

Assembly of the actuator is also simplified in the sense that the motor 78, hub 98, pinion 88 and drive gear 90 are all fully assembled before the cover part is attached to the housing part. For example, the drive gear 90 and the bearings 110 and 114 are first assembled on the hub 98 and captured by the nut 116. At this stage, both outer races 118 and 120 and the spanner nut 122 are loose. The rod 54 and ball screw assembly between the rod and the hub 98 may be assembled.

With the cover part 16 off and both the gear chamber 52 and the bearing chamber 38 open, the rod is inserted into the tubular body 22 of the housing part 14 until the outer race 118 reaches the lip of the bearing chamber 38 at the intersection of wall 46 and cylindrical wall 42. Then, by applying axial force on the right end of the hub 98, the outer race 118 is press fitted in the cylindrical wall 42 until seated on the shoulder 44. The other outer race 120 is similarly aligned with the lip of the cylindrical wall 42 and pressed into the bearing chamber by the spanner nut 122, the latter being turned by a spanner wrench inserted through the reliefs 96 of the drive gear spokes 94.

With the rod 54, the tubular hub 98 and the drive gear 90 assembled on the housing part 14, the motor 78 with the pinion 88 on the shaft 82 is assembled to the housing part and the pinion brought into mesh with the drive gear. Thereafter, the cover part 16 is simply assembled to the housing part 14 over the rod 54 without contacting or otherwise interfering with the drive gear and pinion.

The embodiments of the invention in which an exclusive property or privilege is claimed are defined as follows:

1. An electro-mechanical linear actuator comprising:
   a case having a housing part rigidly connected to a cover part,
   means on said housing part and on said cover part defining a cylindrical inside wall through said case aligned on a primary axis of said case,
   an output rod,
   means mounting said output rod on said case in said inside cylindrical wall for bodily shiftable movement in the direction of said primary axis,
   means on said housing part and on said cover part defining a gear chamber therebetween,
   an electric motor having a rotatable motor shaft,
   a pinion gear rigidly attached to said motor shaft,
   means mounting said motor on said housing part such that said motor shaft supports said pinion on said housing part in cantilever fashion in said gear chamber for rotation about a secondary axis of said case parallel to said primary axis,
   a drive gear in said gear chamber encircling said output rod and meshing with said pinion gear,
   a tubular hub around said output rod rigidly connected to said drive gear,
   bearing means mounting said tubular hub on only said housing part for rotation about said primary axis whereby said drive gear is mounted on said housing part in cantilever fashion for rotation about said primary axis, and ball screw means between said tubular hub and said output rod including screw threads on said output rod and and on said tubular hub and a plurality of bearing balls in channels defined between said screw threads whereby rotation of said tubular hub about said primary axis relative to said output rod effects bodily shiftable movement of said output rod in the direction of said primary axis.

2. The electro-mechanical steering actuator recited in claim 1 wherein said bearing means mounting said tubular hub on only said housing part for rotation about said primary axis includes a first taper roller bearing having an inner race rigidly connected to said tubular hub and an outer race rigidly connected to said housing part, and a second taper roller bearing having an inner race adjoining said first taper roller bearing inner race and rigidly connected to said tubular hub and an outer race rigidly connected to said housing in spaced relation to said first taper roller bearing outer race.

3. An electro-mechanical linear actuator comprising:

a case having a housing part rigidly connected to a cover part, means on said housing part and on said cover part defining a cylindrical inside wall through said case aligned on a main axis of said case, a tubular output rod in said cylindrical inside wall having a cylindrical outside portion and a square outside portion, a first bushing between said housing part and said output rod cylindrical outside portion, a second bushing between said cover part and said output rod square outside portion, said first and said second bushings cooperating in mounting said output rod on said case for only bodily shiftable movement in the direction of said primary axis, means on said housing part and on said cover part defining a gear chamber therebetween, an electric motor having a cylindrical housing and a shaft rotatably supported on said cylindrical housing, means on said housing part defining a cylindrical boss around an access to said gear chamber having an inside wall centered on a secondary axis of said housing part parallel to said primary axis, said cylindrical motor housing being closely received in said inside wall of said cylindrical boss whereby said motor shaft projects into said gear chamber in cantilever fashion and is supported on said housing part for rotation about said secondary axis, a pinion gear rigidly attached to said motor shaft in said gear chamber, means on said housing part defining a bearing chamber opening into said gear chamber and bounded radially by an inside cylindrical wall centered on said primary axis, tubular hub around said output rod having an annular shoulder at one end, a drive gear on said tubular hub abutting said annular shoulder, a first taper roller bearing having an inner race rigidly attached to said hub and an outer race, a second taper roller bearing having an inner race rigidly attached to said hub in abutting relation to said first taper roller bearing inner race and an outer race spaced apart from said first taper roller bearing outer race, each of said first and said second taper roller bearing outer races being press fitted into said bearing chamber inside cylindrical wall whereby said hub and said drive gear are mounted on said housing part in cantilever fashion for rotation about said primary axis, and ball screw means between said tubular hub and said output rod including screw threads on said output rod and on said tubular hub and a plurality of bearing balls in channels defined between said screw threads whereby rotation of said tubular hub about said primary axis relative to said output rod effects bodily shiftable movement of said output rod in the direction of said primary axis.

* * * * *